United States Patent Office

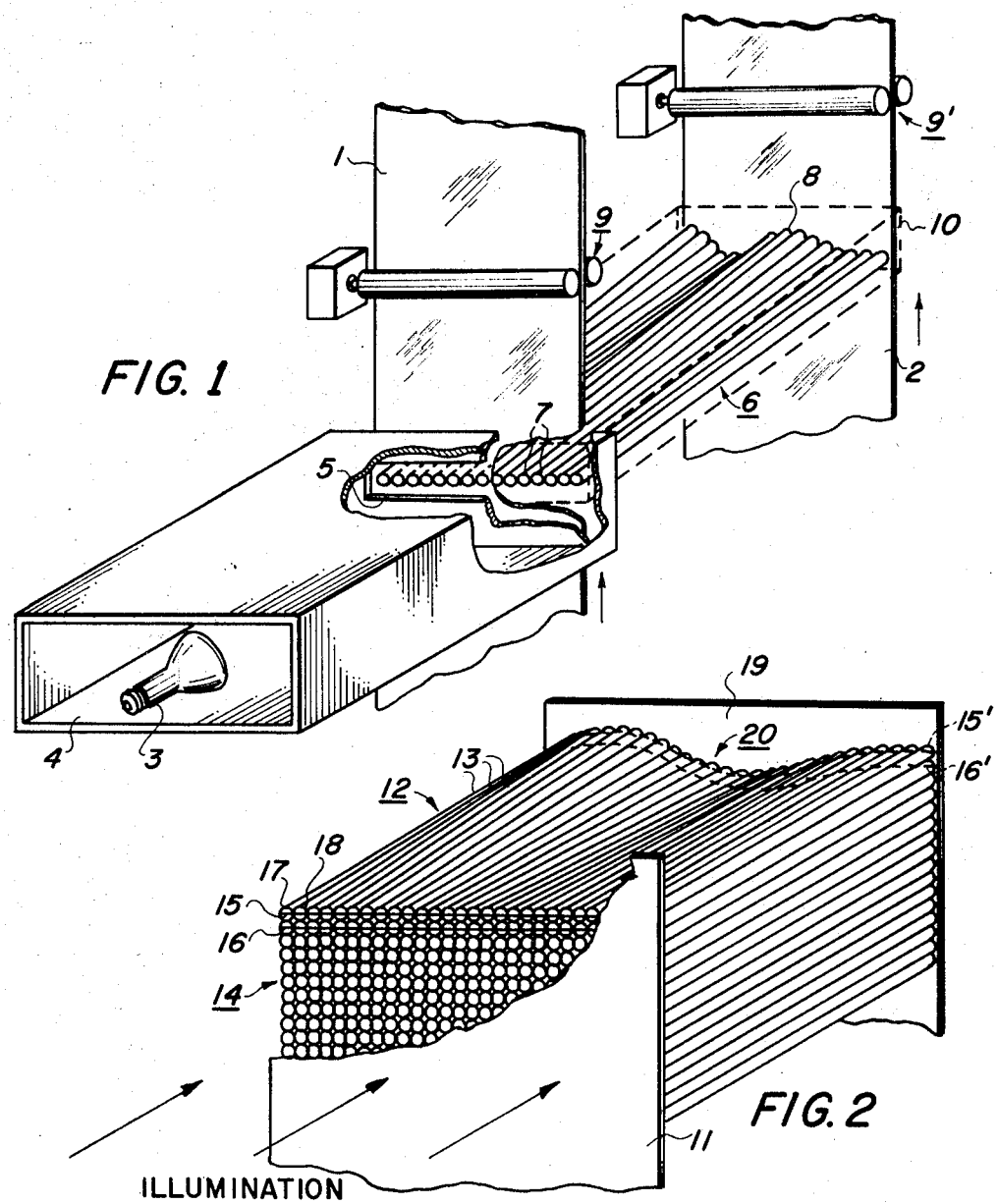

3,560,085
Patented Feb. 2, 1971

3,560,085
APPARATUS FOR GRAPHIC DISTORTION
Morton Silverberg, Pittsford, N.Y., assignor to Xerox Corporation, Rochester, N.Y., a corporation of New York
Continuation of applications Ser. No. 506,635 and Ser. No. 506,794, both filed Nov. 8, 1965. This application Aug. 9, 1968, Ser. No. 751,451
Int. Cl. G03b 27/00
U.S. Cl. 355—1
4 Claims

ABSTRACT OF THE DISCLOSURE

Method and apparatus for scrambling and reconstructing a document pattern so that the resulting scrambled version is unintelligible to the observer and wherein precise registration of the scrambled version with an unscrambling unit is unnecessary. In the first embodiment, a bundle of fiber optics have the ends thereof placed in contact with a document and a recording surface. The document end of the fiber optics is formed into an orderly array of rows and columns, while the recording end of the bundle has the individual fibers formed into a series of corresponding mathematically continuous curves. In the second embodiment, a fiber optic bundle has one end formed as a single straight line and the other end as a mathematically continuous curve, wherein the straight line end of the fiber optic bundle is used to scan an original while the curved end simultaneously composes the distorted image on a copy surface.

RELATED APPLICATIONS

This application is a continuation of U.S. Pat. applications 506,635 and 506,794, both filed on Nov. 8, 1965, now abandoned.

BACKGROUND OF THE INVENTION

For various reasons, both of a business nature and otherwise, it is often desirable to restrict the dissemination of graphically presented information to selected individuals or groups of individuals. Aside from the obvious expedient of safe-guarding a particular graphic document so that individuals other than those authorized may not have access to the contents thereof, it is possible to produce a modified version of the original which in some manner or other contains the same information but in an apparently unintelligible form. A very complex way of doing this, for example, involves the introduction of a cryptographic scheme to encode the original document. This sort of technique, however, is extremely complex, expensive, and time consuming, and is normally used only in instances where the document involved contains information of a most vital nature.

In the type of situation to which the present invention is applicable, the information borne by a particular document is not of the sort that would normally be considered "vital" but rather is more nearly of a general business nature, and is being protected from indiscriminate viewing principally because of the propietary or pecuniary interest therein maintained by the author, disseminator, sponsor or the like. A typical example might involve a microfilmed copyrighted work such as a book or literary article where it is principally the author's copyright that is of concern. While it would obviously be most desirable in such instance to introduce into the microfilmed image means to prevent the unauthorized production of copies thereof, the nature of the protection sought would hardly justify anythink like a cryptographic approach.

In such instances as have been described in the foregoing paragarph, a fairly simple technique for rendering the graphic document unintelligible and one that is well known, involves the use of a bundle of fiber optics to randomly scramble the document pattern so that the resulting scrambled version thereof is completely unintelligible to the observer. This is accomplished in the simplest case by utilizing a bundle of such fiber optics formed at one end into an orderly array of rows and columns. The other end of the bundle has the various individual fibers randomly interwoven whereby the image put in at the ordered end, comes out at the disarrayed end in the desired randomly scrambled pattern. Such a system is used by positioning the ordered end of the optic bundle adjacent the document to be scrambled and the disarrayed end adjacent a photosensitive surface or the like where the scrambled version of the original document is to be produced.

Randomly scrambled documents such as are produced by the techniques described for the prior art are normally viewed by a simple reversal of the process by which they are formed. Physically this means that the randomly located points on the scrambled document are picked out by the individual fibers within the bundles and conducted to the far ends of the fibers where they are realigned at their former positions on the original document. It will be appreciated here, however—and this is of the utmost significance in considering the present invention—that the random location of such points on the scrambled document necessitates an extremely precise aligning or registration of the scrambled document with the disarrayed end of the fiber optic bundle during the reconstruction process. If the disarrayed end of the bundle is ever so slightly out of registration with the points on the scrambled document the fiber optic bundle will pick up points that on the original document are spatially far removed from the desired points.

It will additionally be appreciated that the complete unintelligibility accomplished by random scrambling can in some instances be an actual drawback. The point here is that in many applications it is desirable not that a document be rendered completely unintelligible, but only that it be rendered sufficiently difficult to read that an individual attempting the same would rapidly become discouraged. To go a step further, it may even be desirable that a sufficient degree of comprehension remain that an individual can at least identify the type of document he is looking at, without necessarily being able to read the entire contents thereof.

SUMMARY OF THE INVENTION

This invention provides two techniques for graphically distorting a document by modifying the relative spatial relationships of the various points constituting the document. The techniques are carried out by utilizing two arrangements of a fiber optic bundle.

In the first, one end of the fiber optics is formed into an orderly array of rows and columns while the other end of the bundle has the individual fibers formed into a corresponding series of mathematically continuous curves.

In the second, which is utilized in scanning the document, the fiber optic bundle has one end formed into a single straight line and the other end as a mathematically continuous curve.

It is accordingly, an object of the present invention to provide a method and apparatus for introducing a novel type of distortion into a graphic document.

It is a further object of the present invention to provide a technique for graphically distorting a document that readily lends itself to scanning methods.

It is a further object of the present invention to provide a technique whereby a graphic document may be distorted to a degree sufficient to render it comprehensible only with difficulty, while at the same time maintaining sufficient continuity in the distorted image to enable reconstruction without the necessity of precise registration techniques.

It is a yet further object of the present invention to provide a graphic distortion technique whereby the distorted documents resulting therefrom may be comprehensible to a sufficient degree to enable identification, yet not to such a degree as to enable continuous reading thereof.

These and other objects are achieved in the present invention through the use of a technique whereby successive linear arrays of points on an original document are translated over to the corresponding distorted document, as mathematically continuous curves.

In the first embodiment of the present invention this is accomplished through the use of a fiber optics bundle which in cross-section is essentially one dimensional. The bundle is formed at one end—which for present purposes may be regarded as the input end—into an arrangement which in cross-section is a straight line. The other end of the bundle—which for similar purposes may be regarded as the output end—is formed into a suitable continuous curve. Since the distortion technique is thus carried out on a line to line basis, the original document may be fed past the input end of the fiber optic bundle in synchronism with a recording surface simultaneously translated adjacent the output end of the bundle. Thereafter, and subsequently an undistorted document may be created from the distorted equivalent thereof, by simply reversing the process described, or by utilizing a special viewer.

In the second embodiment of the present invention this is accomplished through the use of a fiber optics bundle in the form of a two-dimensional mat. The bundle is formed at one end which for present purposes may be regarded as the input end—into an essentially rectangular array of rows and columns. The other end of the bundle—which for similar purposes may be regarded as the output end—is so deformed that each row in the aforementioned rectangular array becomes a continuous curve, adjacent rows thereby forming into a pattern which defines a family of curves. A photosensitive recording surface positioned adjacent the output end of the bundle records the continuously distorted image. Thereafter, and subsequently an undistorted document may be created from the distorted equivalent thereof, by simply reversing the process described.

DESCRIPTION OF THE DRAWINGS

For a better understanding of the invention as well as other objects and further features thereof, reference is made to the following description which is read in conjunction with the accompanying drawings and wherein:

FIG. 1 illustrates a first embodiment of the present invention;

FIG. 2 graphically depicts the method for practicing the second embodiment of the present invention; and FIG. 3 illustrates several suitable distortion curves that may in the practice of the present invention be formed from linear arrays of such points on an original document.

DESCRIPTION OF THE PREFERRED EMBODIMENTS

In FIG. 1 an original document 1 is shown in translational motion across an illumination slit 5. This motion may conveniently be established by a document motive means such as the electrically driven feed roll device depicted at 9. For purposes of illustrating the first embodiment of the invention, document 1 may be considered to be a frame of microfilm or similar light transmissible material carrying graphic intelligence thereon. In a case such as this, illumination at the slit 5 is readily provided by the use of light source 3 within the reflecting enclosure 4. At the opposite side of the document 1 and positioned in line with the illuminated area thereof are the multiple open ends 7 of a fiber bundle array 6. The array is supported within an opaque block designated by the dashed line at 10; and these open fiber ends 7 are in the embodiment shown almost in contact with the translating document. It will of course be understood that a modification in the illumination technique would be necessary were document 1 opaque in order that the portion of the document adjacent the fiber ends might be illuminated.

Fiber optics such as are utilized in connection with the present embodiment are fully described in numerous texts on optics; their construction and characteristics are well understood by those skilled in the art. Their operation is essentially based upon the principles of internal reflection and in accordance with this principle light entering the open end of an individual fiber undergoes multiple reflection from the smooth sides thereof, and ultimately emerges at the terminal point of the fiber. Since minute defects and contamination present at the glass boundaries may to some extent interfere with the total reflection characteristics, it is common in applications such as the present to insulate fibers from each other by a thin jacket of transparent material whose index of refraction is lower than that of the fibers. Such material, referred to as cladding, both reduces cross talk and protects the smooth reflecting walls.

It will be appreciated by those skilled in the art that the fiber optic ends shown at 7 are not necessarily intended to be accurately indicative of their true cross-section. In practice, fiber optics are available as narrow as 5 microns in diameter.

The linear array of open fiber optic ends at 7 effectively acts as a moving aperture by virtue of the relative motion existing between this linear array and the document 1. This means that as the graphic material contained on 1 passes across the linear array at 7 virtually every point upon 1 will pass the open input end of at least one fiber. The effective scanning action of the array thus covers the area that in a stationary bundle would be taken up by cladding and dead space. Similar considerations of course apply to the curved output end of the bundle at 8. As is seen in FIG. 1 the distorted output is produced upon the photosensitive recording surface 2. This surface is moved in synchronism with the translation of document 1 by the receiving surface motive means 9'—a device identical to the document motive means 9. Each elemental area or "line" on 1 is thus transformed into a curved line (or "curve") on 2, and the successive parallel scanned lines on 1 are thereby transformed into a family of curves on 2. For purposes of positive illustration, surface 2 may be considered as a portion of a roll of microfilm, although any other photosensitive surface would suffice for the present purposes, including for example the sensitized surface of a xerographic plate or the like. At the conclusion of the exposure process the distorted document image formed upon 2 is if appropriate, developed. Where surface 2 comprises a xerographic plate, a transfer step may also be involved in obtaining the final form of the distorted document. Depending too, upon the specific nature of the original document 1 and of the recording surface 2, image reversal may have to be introduced prior to production of the final distorted document. In the case of any light transmissible material such a reversal can always be brought about by simply reversing the direction of illumination.

FIG. 1 illustrates at 8 a representative curve to which the linear collection of points at 7 may be transformed. Others are illustrated in FIG. 3 at A, B, and C, the corresponding transformed curves being identified by the numerals A', B', and C' respectively. While the curves A', B', and C' will be seen to differ considerably from each other, it will be carefully noted that each represents a continuous curve and in fact for present purposes the transformed curves may be considered as mathematically continuous.

Reconstruction of the original document from one distorted in accordance with the present invention may be readily accomplished by a simple reversal of a process by which the deformed document was constructed. That is to say that a fiber optic bundle which at one end is distorted into a curve identical with that pursuant to which the distortion was prepared is passed in relative motion adjacent to the illuminated distorted version of the document. Rectification then occurs on a second photosensitive surface at the opposite, linear end, of the fiber optics bundle.

In the second embodiment of the invention illustrated in FIG. 2, an original document 11 is shown positioned adjacent an optical converter 12. Optical converter 12 comprises in cross-section a two-dimensional array of fiber optics 13. One end 14 of this two-dimensional mat-like structure may be regarded for present purposes as the input end. The alternate end of the structure at 20 can similarly be regarded for present purposes as an output end. As it is best seen in the diagram, the many fibers composing the converter 12 are arranged at the input end thereof in an orderly matrix array of rows and columns as for example rows 15 and 16 and columns 17 and 18. The alternate end of the structure, however, at 20 is so deformed that each successive row is distorted into a continuous curve. Thus, for example, row 15 is distorted into the form 15' and row 16 is distorted into the adjacent curve at 16'. The distorted curved rows are everywhere equidistant from each other so as to thereby form in mathematical terms a family of curves at the output end 20.

For purposes of illustrating the instant invention document 11 may also be considered to be a frame of microfilm or similar light transmissible material carrying graphic intelligence thereon. In a case such as this, illumination of the document may be conveniently provided by collimated light directed into the plane of the drawings. This is illustrated in FIG. 2 by the arrows appearing in the diagram foreground. In this embodiment of the invention, a photosensitive recording surface such as 19 is positioned adjacent the output end 20 of the optical converter 12. For purposes, including for example the sensitized surface of a sidered as a portion of a roll of microfilm, although any other photosensitive surface would suffice for the present purpose, including for example the sensitized surface of a xerographic plate or the like.

At the conclusion of the exposure process the distorted equivalent document formed upon 19 is as appropriate, developed. The recording process clearly is such that each linear transverse element on the original document 11 is imaged by a corresponding row of fiber optics as an elemental continuous curve on the recording surface. FIG. 2 illustrates for example at 15' a representative curve to which the linear row of points at 15 may be transformed. Others are illustrated in FIG. 3 at A, B, and C, the corresponding transformed curves being identified by the numerals A', B', and C' respectively. The precise transform appropriate will of course depend on the particular characteristics of the optical converter. But while the curves A', B', and C' will be seen to differ considerably from each other, it will be carefully noted that each represents a continuous curve and in fact for present purposes the transformed curves may be considered as mathematically continuous.

Reconstruction of the original document from one distorted in accordance with the present embodiment may be readily accomplished by a simple reversal of the process by which the deformed document was constructed. That is to say that a fiber optic bundle which at one end is distorted into a family of curves identical to those pursuant to which the distortion was prepared is placed adjacent the illuminated distorted version of the document. Rectification then occurs on a second photosensitive surface at the opposite rectangularly arrayed end of the fiber optics bundle. This can be achieved in FIG. 2 for example, by merely considering 11 as representing the photosensitive recording surface, by considering 19 as the light-transmissible distorted document, and providing illumination at 180° to that originally illustrated.

The distorted document produced by the first embodiment of the invention previously described can also be reconstructed by the process just described with reference to the second embodiment of the invention.

While the present invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. Apparatus for distorting a graphic pattern on an original comprising a fiber optic assembly having an input end and an output end, the fibers at said input end being arranged into a rectangular array of straight line rows and columns of individual fiber ends and arranged at said output end into a family of continuous curves, successive curves in said family physically containing the fiber ends of successive adjacent linear rows of fibers at said input end.

2. The apparatus as defined in claim 1 wherein said input end of said fiber optic assembly is adjacent to said original.

3. The apparatus as defined in claim 2 including photosensitive recording means adjacent to said fiber optic output end and means for illuminating said original whereby linear original-wide elements on said original are imaged on the surface of said recording means as corresponding continuous curved elements.

4. The apparatus as defined in claim 3 wherein the totality of said curved elements defines a distorted version of said graphic pattern on said original.

References Cited

UNITED STATES PATENTS

| | | | |
|---|---|---|---|
| 2,982,175 | 5/1961 | Eisler | 355—1 |
| 3,125,013 | 3/1964 | Herrick et al. | 355—1 |
| 3,240,106 | 3/1966 | Hicks | 350—96 |
| 3,283,651 | 11/1966 | King et al. | 355—1 |
| 3,325,594 | 6/1967 | Goldhammer et al. | 350—96 |

OTHER REFERENCES

Krolak et al., Fiber Optics—A New Tool in Electronics, in journal of the SMPTE, vol. 69(10): pp. 708–710.

NORTON ANSHER, Primary Examiner

D. J. CLEMENT, Assistant Examiner

U.S. Cl. X.R.

355—52